Figure 1:
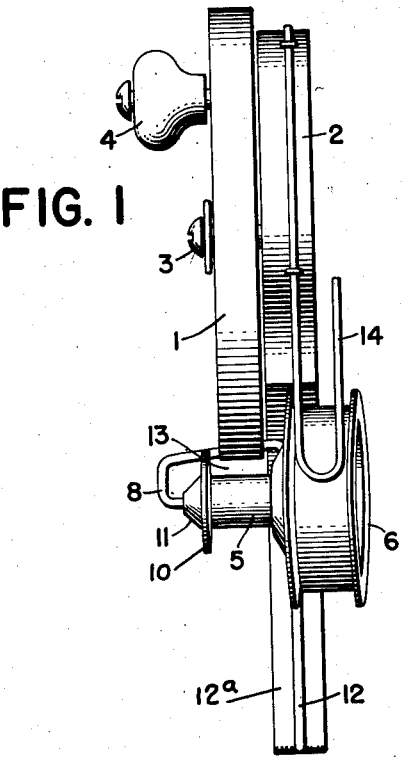

March 11, 1958

C. F. DAUWE 2,826,377

REEL FOR FLYING TOYS

Filed Aug. 14, 1953

2 Sheets-Sheet 1

INVENTOR:
CAMILLE FLORENT DAUWE

BY Richardson, David and Nordon

ATTORNEYS.

March 11, 1958  C. F. DAUWE  2,826,377
REEL FOR FLYING TOYS
Filed Aug. 14, 1953  2 Sheets-Sheet 2
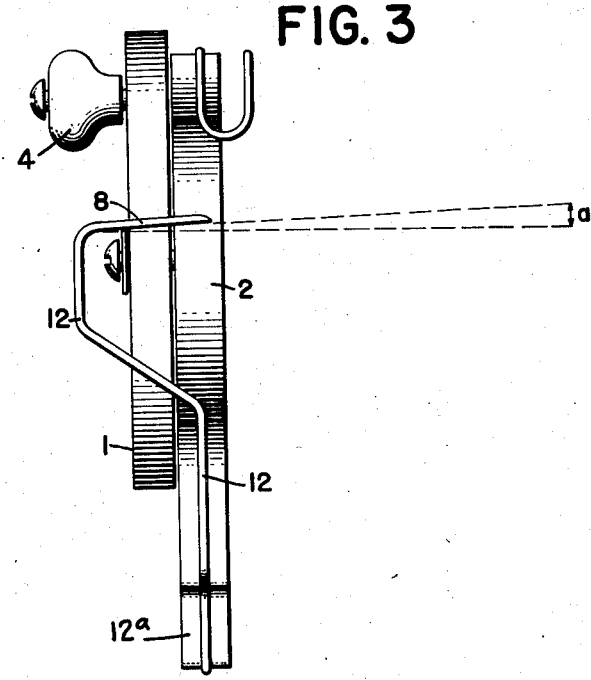
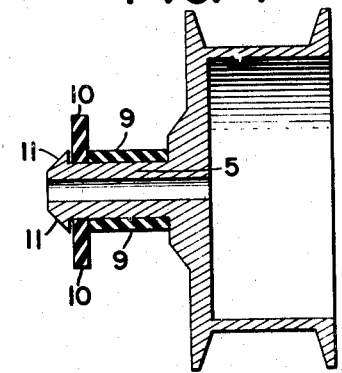
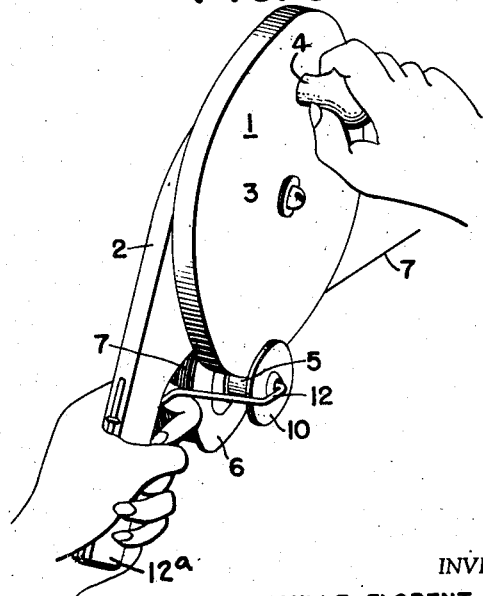
INVENTOR:
CAMILLE FLORENT DAUWE
BY Richardson, David and Nardon
ATTORNEYS.

United States Patent Office 2,826,377
Patented Mar. 11, 1958

2,826,377
REEL FOR FLYING TOYS
Camille Florent Dauwe, Ghent, Belgium
Application August 14, 1953, Serial No. 374,361
Claims priority, application Belgium August 21, 1952
9 Claims. (Cl. 242—96)

The present invention relates to manually operable reels for selectively paying out and reeling in a line to the free end of which an article such as a flying toy, kite, or the like may be attached.

According to the invention, the reel comprises a manually rotatable drive disc for reeling in the line which is wound upon a spool. The disc engages a two-flanged driven wheel to which the winding spool is fixed for rotation therewith. The wheel is rotatably and axially movably mounted on a resilient control member which normally holds the central portion of the wheel slightly spaced away from the periphery of the disc with the flanges embracingly disposed in guiding relationship on opposite sides of the disc. Pressure on the control member will force the central portion of the flanged wheel into frictional driving engagement with the periphery of the disc for reeling in the string. Release of this pressure will permit the spool to revolve freely for paying out the string. The body of the reel is formed with a handle portion and the control member extends in proximity to the handle portion to be grasped simultaneously therewith, leaving the other hand free for manipulation of the driving disc.

Advantageously, one of the wheel flanges is formed of resilient material such as rubber and is removably mounted on the wheel so that the wheel and the spool may be quickly and easily removed from and replaced in the reel as a unit if it should become necessary to disentagle the string or for any other reason. The inner surface of the resilient flange is of a friction enhancing nature and the wheel is axially slidable on the control member so that the reel may be held in a position such that the weight of the wheel and spool will urge the inner lateral friction surface of the resilient flange into braking engagement with one side of the drive disc with pressure on the control member released to disengage the wheel from the disc. This braking action retards the free unreeling of the line. The rotational axis of the flanged wheel is slightly displaced from parallel relationship with respect to the rotational axis of the drive disc so that while the disc and wheel are in frictional driving engagement, the resilient flange will be urged away from the disc to prevent undesired braking action while the line is being reeled in.

Figure 2:
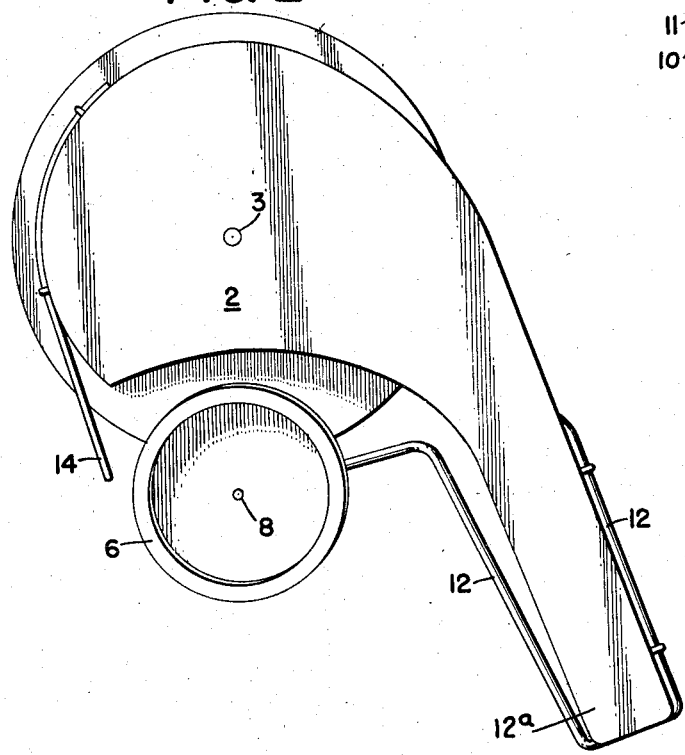

Additional features will appear more particularly upon reading the following specification, reference being had to the accompanying drawings, the disclosed embodiment of the invention being given by way of example and by no means in a limiting sense. In said drawings:

Fig. 1 is an elevational view of the reel with the string omitted;
Fig. 2 is a side view of the reel;
Fig. 3 is a view from below of the whole arrangement, with the spool and the flanged wheel both removed;
Fig. 4 is a longitudinal cross-section of the flanged wheel and of the spool devoid of its string;
Fig. 5 is a general perspective diagrammatic view showing how the reel should be handled for operation.

Referring to Figs. 1, 2, 3 and 5, a rotatable drive disc 1 is secured to the body 2 of the reel through the agency of a screw 3 forming the pivot upon which said disc may revolve. The head of the screw 3 urges the disc into contact under slight frictional conditions with the body 2 of the reel, whereby disc 1 is held in the desired plane of rotation. A knob 4 (Fig. 1) is revolubly and eccentrically mounted on the disc 1 for manual operation of the reel. A two-flanged driven wheel 5 is coaxially fixed to a spool 6 upon which a line 7 is wound (Fig. 5). The flanged wheel 5 is freely revolubly mounted on the shaft portion 8 of a control member which is described in greater detail below. The wheel 5 is integrally formed with the spool 6 (Fig. 4) and is axially movable on the shaft 8. The wheel 5 is disposed with its flange portions guidingly embracing the disc 1 to limit axial movement of the wheel 5 along shaft 8. The central portion of the wheel 5 intermediate its flanges is fitted with a rubber sleeve 9 as shown in Fig. 4. The periphery of disc 1 is smooth and the resilient rubber sleeve 9 enhances the frictional engagement between wheel 5 and disc 1 when spool 6 is being driven by means of the knob 4. The outer flange of wheel 5 consists of a removable washer formed of resilient material such as rubber or the like and which is held in a groove defined by an annular shoulder 11 and one end of the friction sleeve 9 which is axially spaced from the annular shoulder 11 (Fig. 4). With the washer 10 removed, the wheel and spool assembly 5—6 may readily be removed from or replaced in the reel. The washer 10 may be removed and replaced solely by deformation of the resilient material of which it consists.

The inner lateral surface of the rubber washer 10 forms a friction surface which may be moved axially into engagement with the disc 1 to exert a braking action on the spool 6. This may be done by holding the reel so that the weight of the wheel and spool unit 5—6 will cause the desired axial movement with the wheel 5 and disc 1 disengaged.

The transversely extending shaft 8 upon which spool 5 is rotatably mounted is part of a control member which consists of a resilient steel rod or wire 12. One end portion of the rod 12 is fixed to the reel body 2. The remainder of the rod 12 is bent around the end of the elongated handle portion 12a of the reel body 2 and extends longitudinally in proximity to the handle portion 12a so that it may be conveniently manipulated by a user of the reel simultaneously with and by the same hand which grasps the handle portion, thereby leaving the other hand free to turn the disc 1 by means of knob 4. This portion of rod 12 terminates in the transverse shaft 8. The rod 12 normally holds the resilient sleeve 9 spaced away from disc 1 by a small distance 13 as shown in Fig. 1, when no grasping force is applied thereto. By increasing the amount of grasping force which is exerted on the rod 12, the resilient sleeve 9 of wheel 5 may be pressed into frictional engagement with the periphery of disc 1 to reel in or pay out the line. By decreasing this grasping force, the resililent rod 12 will urge the shaft portion 8 away from disc 1 and the wheel and spool unit 5—6 will rotate freely subject, however, to any braking action exerted by the resilient flange 10. A U-shape guide 14 for the line 7 is secured to the reel body 2.

To prevent undesired braking action when reeling in the line, the axis of shaft 8 which determines the rotational axis of the wheel 5 is slightly displaced from parallel relationship with respect to the rotational axis of the disc 1. This slight angle is illustratively shown in Fig. 3 as the angle a which has a magnitude of about 3 degrees. The shaft 8 is also arranged to be as nearly uniformly spaced as possible from the cylindrical surface defined by the periphery of disc 1 to provide uniform engagement between sleeve 9 and disc 1 across the entire thickness of the disc. The angle of displacement $a$ causes axial movement of wheel 5 during driving of wheel 5 by disc 1, the direction of this axial movement being such as to urge the resilient flange 10 away from disc 1 and prevent undesired braking action when reeling in the line.

In operation, the line may be payed out by releasing the grasping pressure on resilient rod 12 so that wheel 5 is disengaged from disc 1. Braking action provided by the friction surface of resilient flange 10 may be applied as desired by turning the reel body 2 in a counterclockwise direction as viewed in Fig. 5 so that the head of screw 3 will be directed upwardly. To reel in the line, the disc 1 is rotated in a clockwise direction as viewed in Fig. 5.

Complete control of the reel is thus obtained using only the left hand of the operator while the right hand of the operator remains free to turn the disc 1 as desired to reel in or pay out the line by means of the knob 4. The disc 1 is of considerably greater diameter than the sleeve 9 so that the spool 6 revolves at a greater speed than the disc 1 when reeling in the line or paying it out under control of knob 4.

What I claim is:

1. A reel of the class described, comprising in combination: a body member having an elongated handle portion adapted to be grasped by a user of the reel; a manually revoluble drive member carried by said body member; a revoluble driven member movably disposed in proximity to said drive member for driving engagement with and disengagement therefrom; a resilient elongated control member having an end portion fixed to said body and comprising an elongated movable portion extending longitudinally in proximity to said handle portion to be grasped by a user of the reel along with said handle portion, said control member further comprising a transverse shaft portion extending generally parallel to the rotational axis of said drive member, said driven member being revolubly disposed on said shaft portion of said control member to be pressed into driving engagement with said driven member by increasing the force with which said handle portion and said longitudinally extending portion are simultaneously grasped and to be disengaged by a reduction in said grasping force; and spool means for reeling and unreeling a line connected to said driven member for rotation therewith.

2. A reel according to claim 1 wherein said driven member is axially movably disposed on said shaft portion, said driven member further comprising a flange portion laterally frictionally engageable with said drive member with said drive member and driven member disengaged, said frictional engagement exerting a braking action on said spool means for restraining said unreeling of said line.

3. A reel according to claim 2, wherein said drive member drives said driven member by frictional engagement therewith, the rotational axes of said driving and driven members being slightly displaced from parallel relationship with respect to each other in a direction to urge said flange portion away from said drive member for preventing said frictional engagement during driving of said driven member by said drive member to reel in said line and permitting said frictional engagement by tilting said body member with said drive member held stationary and said grasping force reduced to otherwise disengage said driven member from said drive member.

4. A reel of the class described, comprising in combination: a body having a handle portion; a manually revoluble drive disc carried by said body; a two-flanged driven wheel disposed with its flanges guidingly embracing lateral peripheral edge portions of said disc, said wheel being movable to bring its central portion intermediate said flanges into driving engagement with the periphery of said disc; manually operable control means disposed in proximity to said handle portion and connected, upon manual operation thereof, to move said wheel into driving engagement with said disc, said control means further including resilient means yieldingly opposing said manual operation and urging said wheel out of driving engagement with said disc; and spool means for reeling and unreeling a line, said spool means being connected to said driven wheel for rotation therewith.

5. A reel according to claim 4, in which the interengaging surfaces of said disc periphery and said central portion of said wheel are both smooth, said reel further comprising means for enhancing the frictional engagement between said smooth surfaces.

6. A reel according to claim 5, in which said friction enhancing means comprises a cylindrical sleeve formed of resilient material and coaxially fixed to said central portion said wheel intermediate said flanges.

7. A reel according to claim 4, wherein said disc drives said wheel by frictional engagement with said central portion, and in which one of the said flanges of said wheel includes an inner lateral frictional surface, said wheel being axially movable with respect to said disc to bring said frictional flange surface into engagement with one side of said disc to exert a braking action on said spool means with said disc periphery and said central portion of said wheel disengaged, and wherein the rotational axis of said wheel is slightly displaced from parallel relationship with respect to the rotational axis of said disc for urging said frictional surface away from said disc during driving engagement between said disc periphery and said central portion of wheel.

8. A reel according to claim 4, wherein one of said flanges is formed of resilient material and is removably secured to said wheel by engagement with means carried by the remainder of said wheel to permit removal of said resilient flange from said wheel solely by deformation of said resilient material, said spool means being directly coaxially connected to said wheel for removal and replacement in said reel along with said flanged wheel and with said resilient flange removed.

9. A reel according to claim 8, in which said resilient material of said removable flange provides an inner lateral friction surface engageable with one side of said disc for exerting a braking action on said spool means, said wheel being axially movable with respect to said disc to permit said braking action with said disc and said central portion of said wheel disengaged, and wherein the rotational axis of said wheel is slightly displaced from parallel relationship with respect to the rotational axis of said disc in a direction to urge said resilient flange of said wheel axially away from said disc during said driving engagement between said wheel and said disc.

References Cited in the file of this patent

UNITED STATES PATENTS

| | | |
|---|---|---|
| 560,925 | Pfluger | May 26, 1896 |
| 872,261 | Slotterbeck | Nov. 26, 1907 |
| 2,018,852 | Hart | Oct. 29, 1935 |
| 2,120,735 | Debrie | June 14, 1938 |